United States Patent [19]

Falz et al.

[11] Patent Number: 5,360,375
[45] Date of Patent: Nov. 1, 1994

[54] DEVICE FOR MECHANICALLY TRANSMITTING TORQUE

[75] Inventors: Ulrich Falz, Dortmund; Jürgen Walter, Haltern; Manfred Lunke, Langenargen, all of Germany

[73] Assignee: Hackforth GmbH & Co. KG, Herne, Germany

[21] Appl. No.: 922,134

[22] Filed: Jul. 30, 1992

[30] Foreign Application Priority Data

Aug. 14, 1991 [DE] Germany ............................ 9110049

[51] Int. Cl.[5] .............................................. F16D 3/76
[52] U.S. Cl. ..................................... 464/091; 464/090
[58] Field of Search ................... 464/90, 180, 91, 117; 74/574, 439

[56] References Cited

U.S. PATENT DOCUMENTS

| | | | |
|---|---|---|---|
| 2,759,759 | 9/1956 | Blackwood | 464/91 X |
| 3,054,276 | 9/1962 | Kleinschmidt | 464/91 |
| 3,813,897 | 6/1974 | Hiersig et al. | 464/91 |
| 4,929,115 | 5/1990 | Lunke et al. | 464/93 |

FOREIGN PATENT DOCUMENTS

| | | | |
|---|---|---|---|
| 1264271 | 8/1958 | Germany . | |
| 1259150 | 1/1968 | Germany | 464/91 |
| 2729927 | 1/1979 | Germany | 464/90 |
| 383702 | 9/1960 | Switzerland . | |

*Primary Examiner*—Daniel P. Stodola
*Attorney, Agent, or Firm*—Robert W. Becker

[57] ABSTRACT

The device for mechanically transmitting torque from a motor to a power transmission is especially suitable for marine propulsion systems as a sound-damping transfer coupling of a drive shaft. The device comprises a damping member with two halves mirror-symmetrical relative to a plane that is perpendicular to the axial direction. Each half is a composite body comprised of a first and a second conical rubber ring of opposite conical orientation. The second conical rubber ring is concentrically arranged inside the first conical rubber ring. A metallic conical center ring is vulcanized to the mantle surfaces of the first and second conical rubber rings that are facing one another. A metallic outer ring is vulcanized to an outer conical mantle surface of the first conical rubber ring and a metallic inner ring is vulcanized to an inner conical mantle surface of the second conical rubber ring. The device further comprises screws for fastening the two halves to one another at the inner and outer rings, whereby the halves are arranged such that a respective base portion of the conical center rings face one another. The device has a strong center ring effect in all directions so that a universal joint may be guided and supported without any further mechanical bearings for the drive shaft.

3 Claims, 1 Drawing Sheet

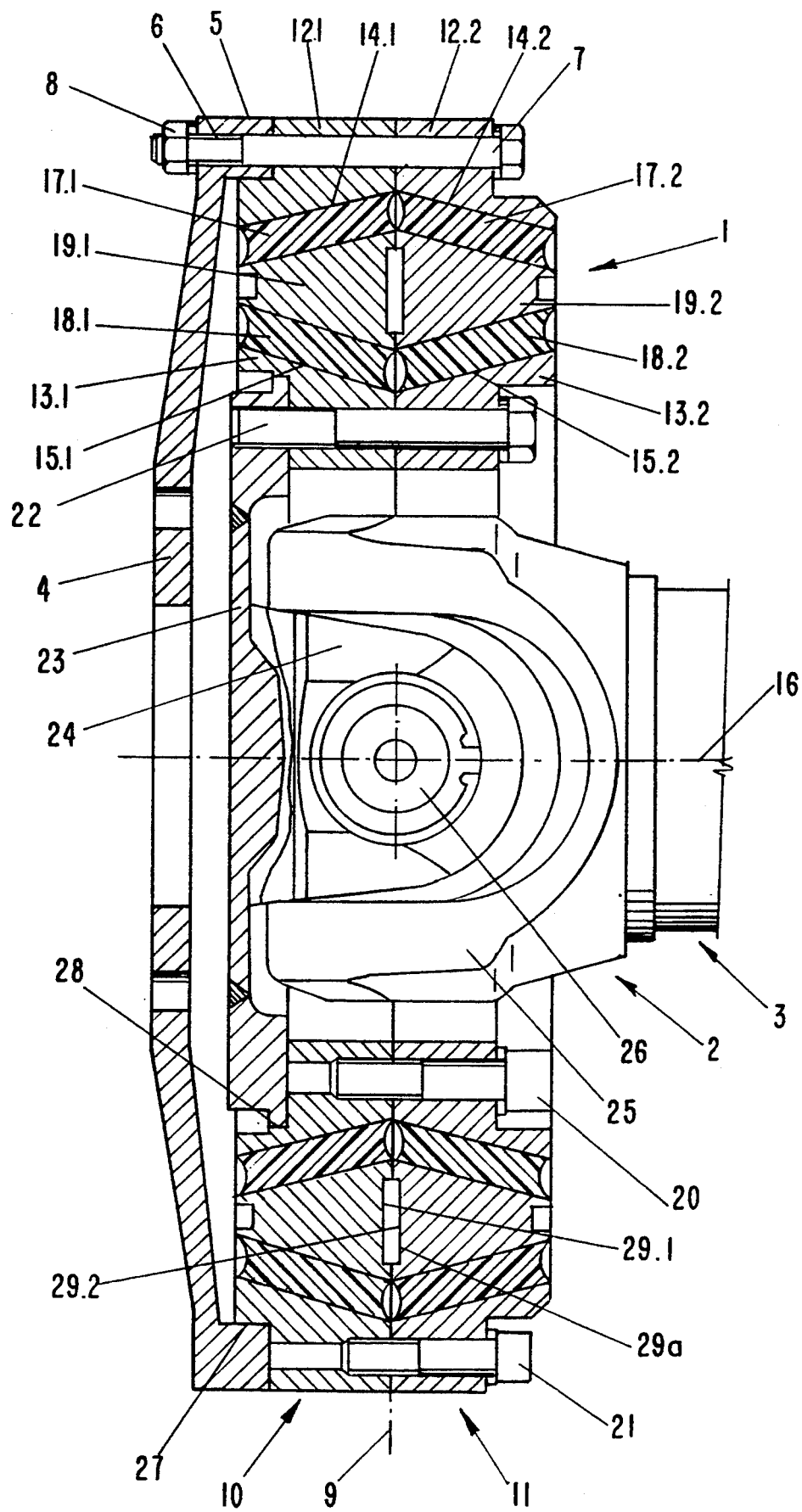

DEVICE FOR MECHANICALLY TRANSMITTING TORQUE

BACKGROUND OF THE INVENTION

The present invention relates to a device for mechanically transmitting torque from a motor to a power transmission, especially an elastic shaft coupling as a transfer coupling for a drive shaft, the device having a damping member comprised of at least one rubber ring and metal parts vulcanized thereto.

Elastic shaft couplings are used in stationary apparatus and in vehicles, for example marine vessels or rail vehicles. Especially in marine vessels it is obviously desirable to reduce noise levels resulting from sound generated by the diesel engine that is conducted through the solid body onto the hull of the marine vessel. In order to meet these requirements an elastic installation of drive units such as motors and of torque converters such as transmissions has been used. With the respective elements for an elastic installation, in the recent past have been embodied mostly as rubber-metal connections, a substantial improvement of the noise damping has been achieved.

In marine propulsion systems, during the transmission of the drive energy onto a propeller, a drive shaft with at least one universal joint has been used for compensating angular deviations along the transmission path, the drive shaft being in a mechanical connection with the propeller thrust bearing. Accordingly, the driving diesel engine is installed in a sound-insulating manner; however, via the thrust bearing motor sound may be transmitted unaltered into the hull of the marine vessel.

It is therefore an object of the present invention to provide a device for torque transmission with favorable characteristics with respect to sound damping that also provides in all directions a center ring effect for attaching thereto a universal joint of a drive shaft without any mechanical support.

BRIEF DESCRIPTION OF THE DRAWING

This object, and other objects and advantages of the present invention, will appear more clearly from the following specification in conjunction with the accompanying only drawing, in which the inventive device is shown in an axial cross-sectional view in connection with an attached universal joint.

SUMMARY OF THE INVENTION

The device for mechanically transmitting torque from a motor to a power transmission according to the present invention is primarily characterized by a damping member comprising two halves mirror-symmetrical to a plane that is perpendicular to an axial direction, each half being a composite body comprised of:

A first and second conical rubber ring of opposite conical orientation, with the second conical rubber ring concentrically arranged inside the first conical rubber ring;

A metallic conical center ring vulcanized to mantle surfaces of the first and second conical rubber rings that are facing one another;

A metallic outer ring vulcanized to an outer conical mantle surface of the first conical rubber ring;

A metallic inner ring vulcanized to an inner conical mantle surface of the second conical rubber ring; and Further comprising screws for fastening the two halves to one another at the inner and outer rings, with the halves arranged with a respective base portion of the conical center rings facing one another.

Preferably, before assembly of the two halves, each conical center ring projects with its base portion axially past the inner and outer rings.

Advantageously, the device further comprises a shimring and the base portion of each conical center ring has an annular groove, the annular grooves aligned with one another, whereby the shimring is inserted into the annular grooves for center ring the conical center rings relative to one another.

In a preferred embodiment, the inner ring of the half facing the motor has an annular recess at its end face adjacent to the motor for receiving a disk connected to a fork flange of a universal joint.

In order to provide a pre-stress of the rubber rings, they are designed such that the metallic conical center rings, before assembly of the two halves, project axially past the respective metallic inner and outer rings.

For a center ring of the metallic conical center rings relative to one another it is expedient to provide aligned annular grooves at the base portion of each center ring and to insert a shimring into these annular grooves.

Advantageously, the metallic inner ring facing the motor is provided at its free end face with an annular recess for centrally receiving a disk that has connected thereto a fork flange of a common universal joint.

In a first special feature of the inventive device, each half of the damping member is provided with a metallic conical center ring embedded in the elastic ring body (comprised of the first and second rubber rings) and isolated from the rigid coupling parts of the drive side and transmission side. Due to such a design, which for elastic bearing elements is also referred to as "sandwich design", higher damping values are achievable.

According to a further inventive feature both rubber rings of each half have a conical shape with opposite orientation. For such an arrangement and design the rubber rings of the two halves may be clamped relative to one another without generating forces that act outwardly. This clamping results in a construction with increased rotational and tilting stability and, in conjunction with the oppositely slanted mantle surfaces of the rubber rings, in a strong centering effect of the two halves of the damping member. Due to this center ring effect a universal joint of a drive shaft, when its joint center is within the plane of symmetry of the elastic damping member, may be guided and supported solely by this device without any further mechanical bearing or support.

DESCRIPTION OF PREFERRED EMBODIMENT

The present invention will now be described in detail with the aid of a specific embodiment utilizing the only Figure.

The device represented in the drawing has a damping member 1 and is designed to be attached to a non-represented motor or drive (on the left side of the drawing) and an inwardly positioned connection of a universal joint 2 connected to a universal joint shaft or drive shaft 3. The connecting member between the motor, respectively, drive and the damping member 1 is a relatively flat disk 4 having at its outer edge an integrated annular projection 5. Over the entire circumference of the annular projection 5 bores 6 are distributed at a uniform distance from one another which receive screw bolts 7 for connecting the damping member 1 and the disk 4 with one another. In the embodiment represented in the drawing the generation of the clamping force is realized by nuts 8 which are threaded onto a projecting threaded portion of the screw bolts 7.

The damping member 1 is comprised of two halves 10, 11 which are mirror-symmetrical relative to a junction plane 9 that is perpendicular to the axial direction. In the following the construction of the left half will be described.

The rigid parts of the drive side and transmission side consist of a metallic outer ring 12.1 and a metallic inner ring 13.1. The mantle surfaces 14.1, 15.1 of the two rings that are facing one another extend at an opposite slant relative to the axis of rotation 16. To each mantle surface 14.1, 15.1 a rubber ring 17.1, 18.1, corresponding with its shape to the slant of the inner, respectively, outer rings, is vulcanized. The free space between the conical rubber rings 17.1 and 18.1 is filled with a metallic center ring 19.1 of a conical cross-section which is connected with its outer and inner mantle surfaces to the respective rubber rings 17.1, 18.1 by vulcanization.

The other half 11 of the damping member 1 is of the same construction with respect to the torque-transmitting functional parts. The assembly of the halves 10, 11 is carried out in a mirror-symmetrical manner along the junction plane 9, as represented in the drawing. The essential parts of the right half 11 are indicated with identical reference numerals, whereby, in order to be able to distinguish between the parts, the parts of the left half 10 have the numeral 1 added after the point and the parts of the right half 11 the numeral 2.

The clamping of the two halves 10, 11 relative to one another is effected by threaded screws 20 on an inner circular arrangement and threaded screws 21 on an outer circular arrangement. The outer circular arrangement coincides with the circular arrangement for the screw bolts 7. The inner circular arrangement also comprises further bores for receiving fastening screws 22. With a number of fastening screws 22 a circular disk 23 is attached to the metallic inner ring 13.1. The fork 24 of the universal joint 2 for the motor is connected to the disk 23. The other fork 25 facing the transmission is connected in a known manner via the universal joint head 26 to the fork 24 in a rotationally fixed, but limited angularly journalled manner.

In order to center the connecting parts 4 on the one hand and 23 on the other hand, the metallic outer ring 12.1 is provided with an annular recess 27, and the metallic inner ring 13.1 is provided with a recess 28.

For centering the metallic center rings 19.1 and 19.2 relative to one another known means may be employed. In the embodiment shown in the drawing a centrally arranged annular groove 29.1, 29.2 of identical radial width is provided at the respective base portion of the center ring into which a shimring 29a is inserted in a form-fitting manner.

As can be seen in the drawing, the universal joint 2 with its joint center is arranged in the plane of symmetry 9 of the dampening member 1. Due to this arrangement a support for the drive shaft 3 by a separate bearing is no longer required.

Due to a simple measure, that is the prestressing of the elastic rubber rings 17.1, 18.1, 17.2, 18.2, their stiffness may be increased and the centering effect of the device may be improved accordingly.

This pre-stress may be generated, for example, by designing the rubber rings 17.1, 18.1, 17.2, 18.2 such that before assembly of the two halves 10, 11 the base portions of the metallic center rings 19.1, 19.2 project past the respective metallic outer and inner rings 12.1, 13.1, 12.2, 13.2. During the subsequent clamping of the two halves 10, 11 relative to one another with the aid of the threaded screws 20 and 21, the metallic center rings 19.1 and 19.2 are forced against the surrounding rubber rings 17.1, 18.1, 17.2, 18.2 and accordingly generate the desired pre-stress within the rubber material which, in comparison to a damping member with no prestressed rubber rings, results in a respective increased stiffness in all directions.

The present invention is, of course, in no way restricted to the specific disclosure of the specification and drawings, but also encompasses any modifications within the scope of the appended claims.

What we claimed is:

1. A device for mechanically transmitting torque from a motor to a power transmission, comprising:
    a damping member comprising two halves mirror-symmetrical relative to a plane that is perpendicular to an axial direction, each said half being a composite body comprised of:
    a first and a second conical rubber ring of opposite conical orientation, with said second conical rubber ring concentrically arranged inside said first conical rubber ring;
    a metallic conical center ring vulcanized to mantle surfaces of said first and second conical rubber rings that are facing one another;
    a metallic outer ring vulcanized to an outer conical mantle surface of said first conical rubber ring;
    a metallic inner ring vulcanized to an inner conical mantle surface of said second conical rubber ring;
    further comprising screws for fastening said two halves to one another at said inner and outer rings, with said halves arranged with a respective base portion of said conical center rings facing one another; and
    further comprising a shim ring, wherein said base portion of each said conical center ring has annular groove, said annular grooves aligned with one another, with said shim ring inserted into said annular grooves for centering said conical center rings relative to one another.

2. A device according to claim 1, wherein said first and said second conical rubber rings are prestressed by said conical center rings when assembled.

3. A device according to claim 1, wherein said inner ring of one of said halves designed to face the motor has an annular recess at its end face proximal to the motor for receiving a disk connected to a fork flange of a universal joint.

* * * * *